US010015199B2

(12) United States Patent
Diehl et al.

(10) Patent No.: US 10,015,199 B2
(45) Date of Patent: Jul. 3, 2018

(54) PROCESSING SECURITY-RELEVANT EVENTS USING TAGGED TREES

(71) Applicant: CrowdStrike, Inc., Irvine, CA (US)

(72) Inventors: David F. Diehl, Minneapolis, MN (US); Maxime Lamothe-Brassard, Ottawa (CA)

(73) Assignee: CrowdStrike, Inc., Irvine, CA (US)

( * ) Notice: Subject to any disclaimer, the term of this patent is extended or adjusted under 35 U.S.C. 154(b) by 0 days.

(21) Appl. No.: 15/433,535

(22) Filed: Feb. 15, 2017

(65) Prior Publication Data
US 2017/0163686 A1 Jun. 8, 2017

Related U.S. Application Data

(62) Division of application No. 14/169,401, filed on Jan. 31, 2014, now abandoned.

(51) Int. Cl.
*H04L 29/06* (2006.01)
*G06F 21/55* (2013.01)
*G06F 21/56* (2013.01)

(52) U.S. Cl.
CPC .............. *H04L 63/20* (2013.01); *G06F 21/55* (2013.01); *G06F 21/56* (2013.01); *H04L 63/1416* (2013.01); *H04L 63/1441* (2013.01)

(58) Field of Classification Search
CPC ..... G06F 21/55; G06F 21/56; H04L 63/1416; H04L 63/1441; H04L 63/20
See application file for complete search history.

(56) References Cited

U.S. PATENT DOCUMENTS 5,721,913 A 2/1998 Ackroff et al.
6,088,804 A 7/2000 Hill et al.
(Continued)

FOREIGN PATENT DOCUMENTS

| EP | 2487860 | | 8/2012 |
| KR | 1020100085424 A | | 7/2010 |
| KR | 101038048 | | 6/2011 |
| WO | WO2012107557 | | 8/2012 |
| WO | WO2012135192 | | 10/2012 |
| WO | WO 2013/164821 | * | 5/2013 |
| WO | WO2013164821 | | 11/2013 |

OTHER PUBLICATIONS

The Partial Supplementary European Search Report dated May 31, 2017 for European Patent Application No. 15743323.6, 11 pages.
(Continued)

*Primary Examiner* — Nelson Giddins
(74) *Attorney, Agent, or Firm* — Lee & Hayes, PLLC; Robert C. Peck; Christopher J. White

(57) ABSTRACT

Devices described herein are configured to propagate tags among data objects representing system components. Such devices may detect an event associated with a plurality of system components. Based at least in part on detecting the event and on a configurable policy, the devices may propagate a tag that is assigned to a data object representing one of the plurality of system components to another data object representing another of the plurality of system components. One example of such a tag may be associated with a tree object that represents an execution chain of at least the system component represented by the data object and the other system component represented by the other data object. Another example of such a tag may be a user-specified tag of another entity that the entity associated with the devices subscribes to.

20 Claims, 6 Drawing Sheets

(56) References Cited

U.S. PATENT DOCUMENTS

| | | | |
|---|---|---|---|
| 6,473,781 B1* | 10/2002 | Skagerwall | G06F 17/30952 707/999.003 |
| 6,925,631 B2* | 8/2005 | Golden | G06F 17/2247 715/234 |
| 7,478,237 B2 | 1/2009 | Costea et al. | |
| 7,583,187 B1 | 9/2009 | Cheng et al. | |
| 7,765,400 B2 | 7/2010 | Costea et al. | |
| 7,765,410 B2 | 7/2010 | Costea et al. | |
| 8,065,728 B2 | 11/2011 | Wang et al. | |
| 8,127,360 B1* | 2/2012 | Wilhelm | G06F 21/552 726/25 |
| 8,234,693 B2 | 7/2012 | Stahl et al. | |
| 8,291,494 B1* | 10/2012 | Sallam | G06F 11/3612 726/22 |
| 8,321,677 B2 | 11/2012 | Morten | |
| 8,407,279 B2 | 3/2013 | Kang | |
| 8,572,247 B2 | 10/2013 | Larson et al. | |
| 8,577,616 B2 | 11/2013 | Dunlap | |
| 8,739,284 B1* | 5/2014 | Gardner | G06F 21/55 726/24 |
| 8,762,298 B1 | 6/2014 | Ranjan et al. | |
| 2002/0143742 A1* | 10/2002 | Nonomura | G06F 17/30923 |
| 2002/0156814 A1* | 10/2002 | Ho | G06F 9/541 715/205 |
| 2003/0101357 A1 | 5/2003 | Ronen et al. | |
| 2004/0049693 A1* | 3/2004 | Douglas | G06F 21/552 726/23 |
| 2006/0101263 A1 | 5/2006 | Costea et al. | |
| 2006/0143688 A1* | 6/2006 | Futoransky | H04L 63/102 726/1 |
| 2006/0174323 A1 | 8/2006 | Brown et al. | |
| 2006/0242090 A1* | 10/2006 | Matsuda | G06F 17/50 706/12 |
| 2007/0022287 A1 | 1/2007 | Beck et al. | |
| 2007/0094496 A1 | 4/2007 | Burtscher | |
| 2007/0113289 A1* | 5/2007 | Blumenau | G06F 17/30085 726/26 |
| 2007/0250817 A1 | 10/2007 | Boney | |
| 2008/0034429 A1 | 2/2008 | Schneider | |
| 2008/0189796 A1* | 8/2008 | Linn | G06F 21/51 726/30 |
| 2008/0209505 A1* | 8/2008 | Ghai | G06F 21/55 726/1 |
| 2008/0253287 A1 | 10/2008 | Gupta et al. | |
| 2008/0282198 A1* | 11/2008 | Brooks | G06Q 10/10 715/854 |
| 2009/0089288 A1* | 4/2009 | Petersen | G06F 17/30867 |
| 2009/0216806 A1 | 8/2009 | Feuerstein et al. | |
| 2009/0271843 A1* | 10/2009 | Kai | G06F 21/6209 726/1 |
| 2009/0282062 A1* | 11/2009 | Husic | G06F 21/62 |
| 2010/0074446 A1 | 3/2010 | Fuchs et al. | |
| 2010/0169973 A1 | 7/2010 | Kim et al. | |
| 2010/0235622 A1 | 9/2010 | Robinton et al. | |
| 2010/0312890 A1 | 12/2010 | Bernosky | |
| 2011/0029772 A1 | 2/2011 | Fanton et al. | |
| 2011/0099632 A1 | 4/2011 | Beck et al. | |
| 2011/0107273 A1* | 5/2011 | Ranganathan | G06F 8/10 715/854 |
| 2011/0107419 A1 | 5/2011 | Vidal et al. | |
| 2011/0209219 A1 | 8/2011 | Zeitlin et al. | |
| 2011/0239306 A1 | 9/2011 | Avni et al. | |
| 2012/0005542 A1 | 1/2012 | Petersen et al. | |
| 2012/0063649 A1 | 3/2012 | Pettit et al. | |
| 2012/0124594 A1 | 5/2012 | Mikami | |
| 2012/0137375 A1 | 5/2012 | Ramachandran et al. | |
| 2012/0167161 A1 | 6/2012 | Kim | |
| 2012/0246297 A1 | 9/2012 | Shanker et al. | |
| 2012/0255012 A1 | 10/2012 | Sallam | |
| 2012/0304247 A1* | 11/2012 | Badger | G06F 21/6218 726/1 |
| 2013/0051624 A1 | 2/2013 | Iwasaki et al. | |
| 2013/0086627 A1* | 4/2013 | Bryan | H04L 63/10 726/1 |
| 2013/0218835 A1* | 8/2013 | Greenspan | G06F 17/301 707/610 |
| 2013/0291112 A1 | 10/2013 | Shue et al. | |
| 2013/0332981 A1 | 12/2013 | Paris et al. | |
| 2013/0333040 A1* | 12/2013 | Diehl | G06F 9/46 726/24 |
| 2014/0007184 A1* | 1/2014 | Porras | G06F 21/53 726/1 |
| 2014/0007190 A1 | 1/2014 | Alperovitch et al. | |
| 2014/0109226 A1 | 4/2014 | Diehl et al. | |
| 2014/0115010 A1* | 4/2014 | Seth | G06F 17/30861 707/798 |
| 2014/0122420 A1* | 5/2014 | Van Rotterdam | G06F 17/30309 707/609 |
| 2014/0208404 A1* | 7/2014 | Brouwer | G06F 21/62 726/6 |
| 2014/0223555 A1* | 8/2014 | Sanz Hernando | G06F 21/55 726/22 |
| 2015/0135283 A1 | 5/2015 | Tofighbakhsh | |
| 2015/0222646 A1 | 8/2015 | Diehl et al. | |

OTHER PUBLICATIONS

King et al, "Backtracking Intrusions", ACM SOSP, Oct. 2003, vol. 37, Issue 5, 14 pgs.

Final Office Action for U.S. Appl. No. 13/492,672, dated Oct. 23, 2014, David F. Diehl, "Kernel-Level Security Agent", 15 pages.

Office Action for U.S. Appl. No. 14/169,401, dated Oct. 26, 2015, David F. Diehl, "Tagging Security-Relevant System Objects", 18 pages.

Office action for U.S. Appl. No. 14/169,401, dated Nov. 15, 2016, Diehl et al., "Tagging Security-Relevant System Objects", 25 pages.

Final Office Action for U.S. Appl. No. 13/538,439, dated Dec. 2, 2014, Dmitri Alperovitch, "Social Sharing of Security Information in a Group", 13 pages.

Final Office Action U.S. Appl. No. 13/728,746, dated Dec. 3, 2014, David F. Diehl, "Real-Time Representation of Security-Relevant System State", 22 pages.

Office action for U.S. Appl. No. 14/169,401, dated Feb. 23, 2016, Diehl et al., "Tagging Security-Relevant System Objects", 20 pages.

Office Action for U.S. Appl. No. 13/728,746, dated Apr. 14, 2014, David F. Diehl, "Real-Time Representation of Security-Relevant System State", 17 pages.

Office Action for U.S. Appl. No. 13/538,439, dated Apr. 23, 2015, Dmitri Alperovitch, "Social Sharing of Security Information in a Group", 6 pages.

Office Action for U.S. Appl. No. 13/492,672, dated Apr. 7, 2014, David F. Diehl, "Kernel-Level Security Agent", 8 pages.

Office action for U.S. Appl. No. 14/169,401, dated Jun. 24, 2016, Diehl et al., "Tagging Security-Relevant System Objects", 19 pages.

Office action for U.S. Appl. No. 13/538,439, dated Jun. 30, 2014, Alperovitch et al., "Social Sharing of Security Information in a Group", 13 pages.

The PCT Search Report and Written Opinion dated Apr. 28, 2015 for PCT application No. PCT/US2015/013522, 13 pages.

The PCT Search Report and Written Opinion dated Apr. 29, 2014 for PCT application No. PCT/US13/75856, 13 pages.

The PCT Search Report and Written Opinion dated Sep. 17, 2013 for PCT application No. PCT/US2013/040420, 12 pages.

The PCT Search Report and Written Opinion dated Sep. 26, 2013 for PCT Application No. PCT/US13/40428, 13 pages.

The Extended European Search Report dated Sep. 4, 2017 for European Patent Application No. 15743323.6, 9 pages.

\* cited by examiner

PROCESSING SECURITY-RELEVANT EVENTS USING TAGGED TREES

RELATED APPLICATIONS

This patent application is a divisional of, and claims priority to and the benefit of, U.S. patent application Ser. No. 14/169,401, entitled "Tagging Security-Relevant System Objects," filed on Jan. 31, 2014, which is fully incorporated herein by reference.

BACKGROUND

With Internet use forming an ever-greater part of day-to-day life, malicious software (often referred to as "malware") and other security exploits that steal or destroy system resources, data, and private information are an increasing problem. Governments, businesses and individuals may devote significant resources to preventing intrusions, damage and thefts related to these security exploits. Security exploits come in many forms, such as computer viruses, worms, trojan horses, spyware, keystroke loggers, adware and rootkits. Such security exploits can be delivered in or through a variety of mechanisms, such as phishing emails, malicious clickable links, infected documents, infected executables, or infected archives.

Tools for addressing these threats may apply conditional logic, testing whether some aspect of a system component, such as a process or file, matches one of more criteria. Based on meeting the criteria, the tools may take some action or actions. Modifications to the criteria, which may alter the system components that are identified, may be cumbersome. For instance, such modifications may require changes to the source code of the tools and recompiling of the tools.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
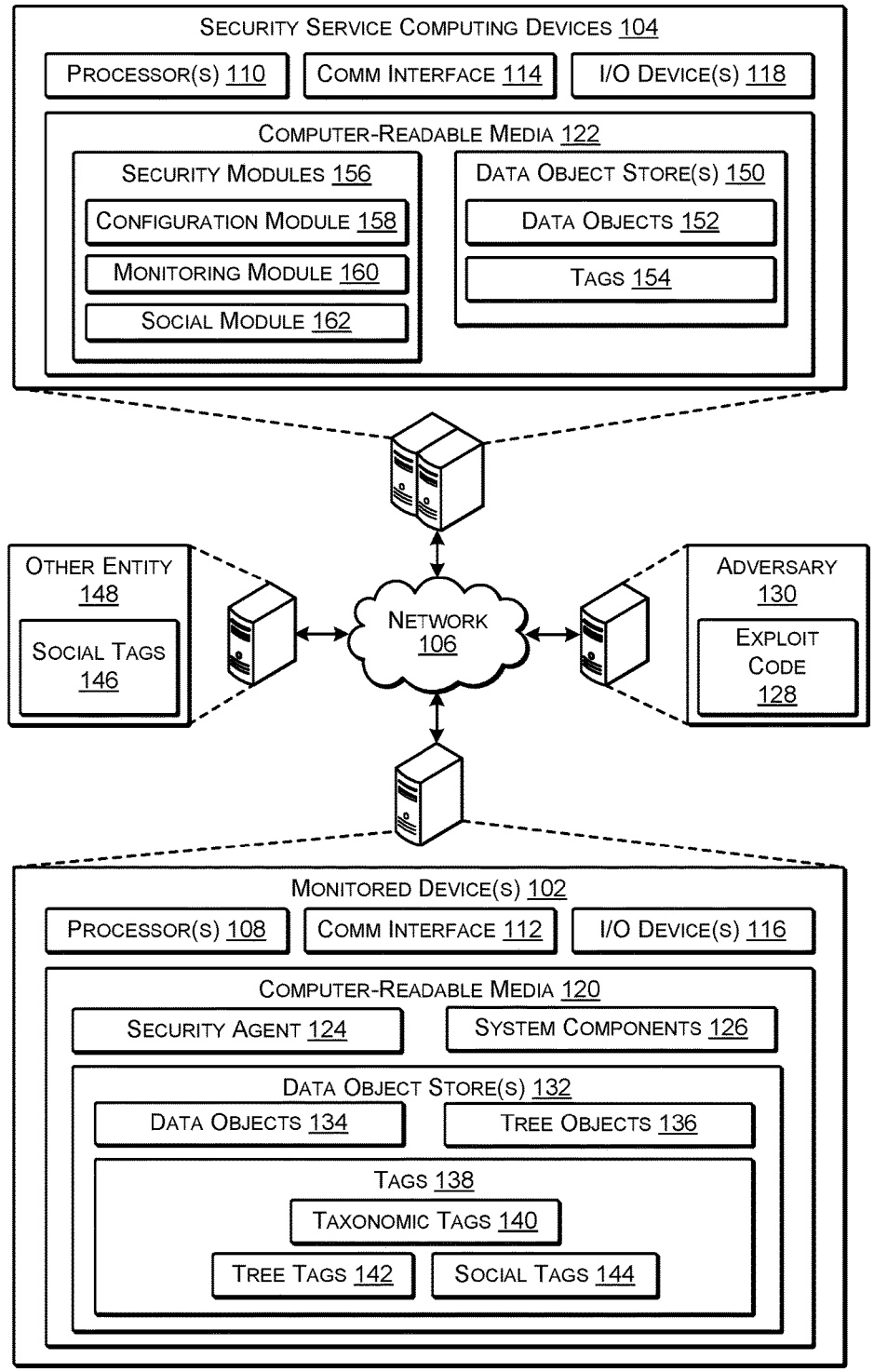
FIG. 1 illustrates an example framework and devices for enabling interaction between a monitored device and a security service cloud.

This disclosure includes techniques and arrangements for assigning tags to data objects representing system components associated with security-relevant system events (hereinafter simply "events") and for propagating tags among the data objects based on those events and on a configurable policy. As used herein, the term "tag" refers to data object metadata that acts as a label or classifier of a data object. A tag may be a string, an integer, a hash, a binary flag, or some other efficient representation. Tags enable filtering of data objects for reporting, decision-making, and event generation and allow reclassification of data objects without any need for recoding or recompiling.

In various embodiments, one or more monitored devices may each be equipped with a security agent to monitor events on those respective one or more computing devices and a data store to maintain data objects representative of system components associated with those events. Those monitored computing devices may be in communication with devices of a security service cloud. The security service cloud may be also be configured to monitor events on those monitored computing devices and to maintain data objects representative of system components associated with those events in a data object store of the security service cloud. The security agents and security service cloud may monitor the same events, different events, or overlapping sets of events. Also, in some embodiments, the security agents may simply detect events and inform the security service cloud of those detected events. The data object stores of the security agents and security service cloud may include data objects representing the same system components, data objects representing different system components, or an overlapping set of data objects.

A security agent or security service cloud may first assign tags to the data objects based on a configurable policy. Such tags may be considered "taxonomic tags" which classify a type, function, role, etc. of a system component. For example, "document program" may be such a "taxonomic tag." The security agent or security service cloud may also assign tags to data objects based on the observed behaviors or characteristics of the system components they represent. For instance, if a process repeatedly opens document files, the security agent or security service cloud may assign the tag "document program" to the process.

The security agent or security service cloud may detect or be informed of events and the system components associated with those events. Such events could include processes spawning other processes or threads, processes creating or opening files, etc. These events may include all events occurring on a monitored computing device or a subset of those events. If a subset, the security agent or security service cloud may be configured to filter events based on a configuration of the security agent or on a configurable policy (as used herein, "configurable policy" may refer to the configuration of the security agent or to a policy utilized by the security agent or security service cloud).

Based on the detected event and on the configurable policy, the security agent or security service cloud may propagate a tag assigned to one data object representing a system component associated with the event to another data object representing another of the system components associated with the event. For example, if a process creates a file, the security agent or security service cloud may propagate one or more tags of the data object for that process to the data object for that file. The security agent or security service cloud may propagate all of the tags of the data object for the process or only a subset of those tags based at least in part on the configurable policy. Propagation may occur in both directions, too; tags of the data object representing the file may also be propagated to the data object representing the process. In another example, a process may spawn multiple threads, and the security agent or security service cloud may propagate one or more tags of the data object for that process to all or only a subset of the data objects for those threads based at least in part on the configurable policy.

In some embodiments, the security agent or security service cloud may generate a data object that represents detected event and assign a tag to that data object, such as "suspicious event." Such tags may be updated in response to detecting a subsequent event. For example, if a first event is merely suspicious, it may later be seen as security exploit activity if a second event occurs. In such a case, the tag may be updated to reflect the additional context (e.g., the tag "suspicious event" may be updated to "exploit activity").

In various embodiments, the security agent or security service cloud may also create a tree object to represent an execution chain of system objects associated with the event. For example, if an event involves one process executing another process, that execution chain could be represented in a tree object. If the other process then creates a file, that file could also be represented in the tree object. The security agent or security service cloud can assign tags to the tree object and can assign a tree object tag to data objects representing the system components with appear in the tree object. Through the tree object tag, tags assigned to the tree object may be considered as tags of the data objects assigned the tree object tag. This enables retrospective classification of system components. For instance, nothing may be suspicious about a particular process when it first executes another. But if that other process then goes on to execute a further process, and the further process performs an action recognized as security exploit activity, the tag "security exploit" may be assigned to the tree object representing that execution chain. And because a tree object tag for that tree object is assigned to the original process, that original process now, through the tree object tag and tree object, has the tag "security exploit."

In further embodiments, the security agent or security service cloud may enable a user to assign tags to data objects representing system components. These user-specified tags may be utilized by security agents of an entity associated with the user. Such tags may be utilized to classify system components that have not yet been classified in the configurable policy. For example, a particular process may be a document program, but a security agent utilizing the configurable policy may not recognize the process as such. The user may assign the tag "document program" to the data object representing that process. These user-specified tags may then later be considered in updating the configurable policy and taxonomic tags. Also, an entity may subscribe to another entity's user-specified tags, causing that other entity's user-specified tags to be assigned to the entity's data objects.

In some embodiments, the security agent or security service cloud may then utilize the tags to make decisions, generate reports, or even generate events. For example, if a tag is propagated to a data object that has been assigned a tag that conflicts with the propagated tag, the security agent or security service cloud may generate a tag conflict event.

Additionally, the security agent or security service cloud may update the tags assigned to the data objects based on an update to the configurable policy. Such updating may allow for reclassification without burdensome activities like recoding or recompiling the security agent or security service cloud.

Example Framework and Devices

FIG. 1 illustrates an example framework and systems for enabling interaction between a monitored device and a remote security service. As illustrated, one of more monitored devices 102 may be connected to security service computing devices 104 of a security service cloud via a network 106. In various embodiments, the monitored devices 102 may each be a server or server farm, multiple, distributed server farms, a mainframe, a work station, a personal computer (PC), a laptop computer, a tablet computer, a personal digital assistant (PDA), a cellular phone, a media center, an embedded system, or any other sort of device or devices. When implemented on multiple computing devices, a monitored device 102 may distribute its modules and data among the multiple computing devices. In some implementations, a monitored device 102 represents one or more virtual machines implemented on one or more computing devices. Also, each monitored device 102 may be associated with an entity, and the entity or entities may in turn have security service arrangements with a security service provider. The security service provider may in turn operate a security service cloud, which may include the security service computing devices 104.

In some embodiments, the security service computing devices 104 may each be or include a server or server farm, multiple, distributed server farms, a mainframe, a work station, a PC, a laptop computer, a tablet computer, a PDA, a cellular phone, a media center, an embedded system, or any other sort of device or devices. In one implementation, the security service computing devices 104 implementing the security service cloud represent a plurality of computing devices working in communication, such as a cloud computing network of nodes. When implemented on multiple computing devices, a security service computing device 104 may distribute its modules and data among the multiple computing devices. In some implementations, one or more of the security service computing devices 104 represent one or more virtual machines implemented on one or more computing devices.

The network 106 may include any one or more networks, such as wired networks, wireless networks, and combinations of wired and wireless networks. Further, the network 106 may include any one or combination of multiple different types of public or private networks (e.g., cable networks, the Internet, wireless networks, etc.). For example, the network 106 may include a public network and a client network associated with one of the entities. Such a client network may each be a private network. In some instances, computing devices communicate over the network 106 using a secure protocol (e.g., Hypertext Transfer Protocol Secure (https)) and/or any other protocol or set of protocols, such as the transmission control protocol/Internet protocol (TCP/IP).

As is further shown, each monitored device 102 may have a processor 108, and each security service computing device 104 may have a processor 110. Processors 108 and 110 may each be a central processing unit (CPU), a graphics processing unit (GPU), or both CPU and GPU, or other processing unit or component known in the art. Processors 108 and 110 may be different types of processing units or components or may be of the same type.

Each monitored device 102 may also have a communication interface 112, and each security service computing device 104 may have a communication interface 114. The communication interfaces 112 and 114 may be any sort of wired or wireless interfaces (or both) that enable their respective devices to communicate over the network 106 with other devices, including with each other. The communication interfaces 112 and 114 may be the same or different types of communication interfaces.

The monitored device(s) 102 each have input/output (I/O) devices 116, and the security service computing devices 104 each have I/O devices 118. The I/O devices 116 and 118 may include input devices, such as a keyboard, a mouse, a touch-sensitive display, voice input device, etc., and output devices such as a display, speakers, a printer, etc. The I/O devices 116 and 118 may be the same or different types of I/O devices. The I/O devices 116 of the monitored device(s) 102 may be used to enter user-specified tags, to subscribe to other entities' tags, and to view reports. The I/O devices 118 of the security service computing devices 104 may be used to specify the configurable policy, specify taxonomic tags, and view reports.

In various embodiments, each monitored device has one or more computer-readable media 120, and each security service computing device 104 has one or more computer-readable media 122. Computer-readable media 120 and 122 may include any tangible, non-transitory storage media. For instance, computer-readable media 120 and 122 may include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by the respective monitored device 102 or security service computing device 104. Further, computer-readable media 120 and 122 may be removable and/or non-removable.

As illustrated in FIG. 1, the computer-readable media 120 of each monitored device 102 stores a security agent 124. The security agent 124 may be a kernel-level agent or may reside partly on a monitored device 102 and partly on the security service cloud. The security agent 124 may include event consumers that receive notifications of events associated with execution activities of system components 126, filters, an event bus that routes the events to other module(s) of the security agent 124, correlators that track types of events and/or maintain state associated with events, and actors that gather state information and act upon events.

The security agent 124 may be installed by and configurable by a security service cloud, such as by one or more of the security service devices 104, receiving, and applying while live, reconfigurations of module(s) of the security agent 124. The security agent 124 may also receive and apply, while live, configurable policies from the security service cloud. Such configurable policies may be the same as or different from the configuration of the security agent 124. An example security agent is described in greater detail in U.S. patent application Ser. No. 13/492,672, entitled "Kernel-Level Security Agent" and filed on Jun. 8, 2012.

The system components 126 may be any sort of module, process, thread, file, driver, service, pipe, handle, named kernel object, memory segment, user, cryptographic signer and signature authority, registry key, Internet Protocol (IP) address and subnet, domain name service (DNS) domain, or fully-qualified domain name (FQDN) of the monitored device 102. A system component 126 that is a module may be identified by a hash of its contents. These system components 126 may include both platform and application components.

As mentioned, the security agent 124 receives notifications of execution activities, such as events, associated with these system components 126, filters and dispatched the events in accordance with the configuration of the security agent 124, and acts upon the events. Such actions may simply be recording and further monitoring or may rise to the level of remediation or alerts. In monitoring these events, the security agent 124 attempts to detect indications of exploit code 128 or other malicious activity of an adversary 130.

The security agent 124 may further include or be associated with a data object store 132. While FIG. 1 shows the data object store 132 as separate from the security agent 124, it is to be understood that the data object store 132 may either be a part of the security agent 124 or may be separate from and associated with the security agent 124. The data object store 132 may represent current and past states of the monitored device 102. The past states maintained include at least a subset of past states, such as states that enhance forensic and policy understanding of the current state.

The data object store 132 may have at least three roles. In a first role, the data object store 132 may serve as a historian, providing access to past states of the monitored device 102 that are no longer stored elsewhere on the monitored device 102. In a second role, the data object store 132 may service as a validator, maintaining an independent model of the state of the monitored device 102 that can be used to detect malicious modifications of the host operating system state storage of the monitored device 102. In a third role, the data object store 132 provides a cache of configuration, information, and state that are received from a remote security service, that are computationally expensive to generate or fetch, or that are high-latency to fetch. An example of such a data object store is described in greater detail in U.S. patent application Ser. No. 13/728,746, entitled "Real-Time Representation of Security-Relevant System State" and filed on Dec. 27, 2012.

The data object store 132 may include a plurality of data objects 134 that represent system components 126 and events. These data objects 134 may form one or more graphs composed of nodes and edges, with node data objects representing system components 126 and edge data objects representing events. The security agent 124, through any of its actors or correlators, may create and update the data objects 134. In some embodiments, the data object store 132 may also be associated with functional components that are capable of creating and updating the data objects 134 based on events received from filter and dispatch components of the security agent 124.

In various embodiments, the data object store 132 may also maintain one or more tree objects 136. Tree objects 136 may represent execution chains of system components 126. Whether or not the security agent 124 creates a tree object 136 responsive to an event may be determined based on the configurable policy received from the security service cloud.

As is further shown in FIG. 1, the data object store 132 may maintain tags 138 for some or all of the data objects 134 and tree objects 136. Each tag 138 acts as a label or classifier of a data object 134 or a tree objects 136. While the tags 138 are shown separately from the data objects 134 and tree objects 136 in FIG. 1, it is to be understood that each tag 138 may be stored as metadata of a specific data object 134 or tree object 136, although such storage may be contiguous or non-contiguous.

Tags 138 may have structure. The presence of a tag 138 can require another tag 138 (e.g., "Office2010" requires "Office" requires "document program") or at least one member of a set of tags 138 (e.g., "updater" requires some other tag 138 indicating something which can be updated). Alternatively, such structure may be avoided with a hierarchy or via tag duplication. Such alternatives may be considered to avoid the computational expense of the tag structure. Tags 138 can also be mutually exclusive with each other (e.g., "document program" and "system program" may be mutually exclusive).

Further, tags 138 may be of any of a number of varieties, such as taxonomic tags 140, tree tags 142, and social tags 144. Tags 138 may also be of any of any number of different types, depending on implementation. Taxonomic tags 140 may be centrally declared and standardized (e.g., by the security agent 124 or by the security service cloud), and may be used to pass defined indications that may enable decision-making and direct actions. In some embodiments, taxonomic tags 140 may only be assigned by security service cloud code or authorized employees of the security service provider through controlled interfaces. Examples of taxonomic tags 140 may be classifications, such as a "CS_ShowInUI" tag for use in detections. Taxonomic tags 140 may be flagged to never display to a customer.

Tree tags 142 are dynamically created on a monitored device 102 along with tree objects 136 and serve to identify those tree objects 136. Each tree tag 142 may be assigned to data objects 134 which represent system components 126 that are included in the tree object 142 identified by that tree tag 142. Tree tags 142 serve to associate data objects 134 with the taxonomic tags 140, social tags 144, or other tags 138 that are assigned to their respective tree objects 136.

Social tags 144 may be created and assigned by users of the monitored devices 102. Social tags 144 may be controlled by an entity associated with a monitored device 102 rather than centrally controlled by the security service cloud. The social tags 144 may, however, be provided to the security service cloud and have indirect effects on the security service cloud based on data analytics or manual propagation rules using the social tags 144 to assign taxonomic tags 140. Social tags 144 may include the identifier of the entities whose users created those social tags 144. Also, many taxonomic tags 140 may appear as social tags 144. For example, with a user associated with an entity may assign a "document program" tag 144 to an executable that the security service cloud has not classified with a taxonomic tag 140.

Also, in some embodiments, the tags 138 may include a tag 138 for a "system" data object 134 that can be tagged to adjust overall posture of the monitored device 102, as a lightweight alternative to full multi-modal configurations. This may cause the event filtering of the security agent 124 to start with a posture check.

In various embodiments, the security agent 124 may, in accordance with the configurable policy received from the security service cloud, assign tags 138 to data objects 134. For example, the security agent 124 may assign taxonomic tags 140 to at least some of the data objects 134 based on the types, observed behaviors, or characteristics of the system components 126 or events that those data objects 134 represent. The security agent 124 may also assign tags 138 to tree objects 136 based at least in part on the configurable policy.

The security agent 124 may assign or remove tags 138 from data objects 134 or tree objects 136 directly with standard events, allowing dynamic control of tags 138, both programmatically and manually. Also, or instead, tag assignment may be triggered by any detected event. In such circumstances, tags 138 may be assigned to the data objects 134 representing the system components 126 associated with the event, to a data object 134 that represents the detected event, or to both.

Figure 2:
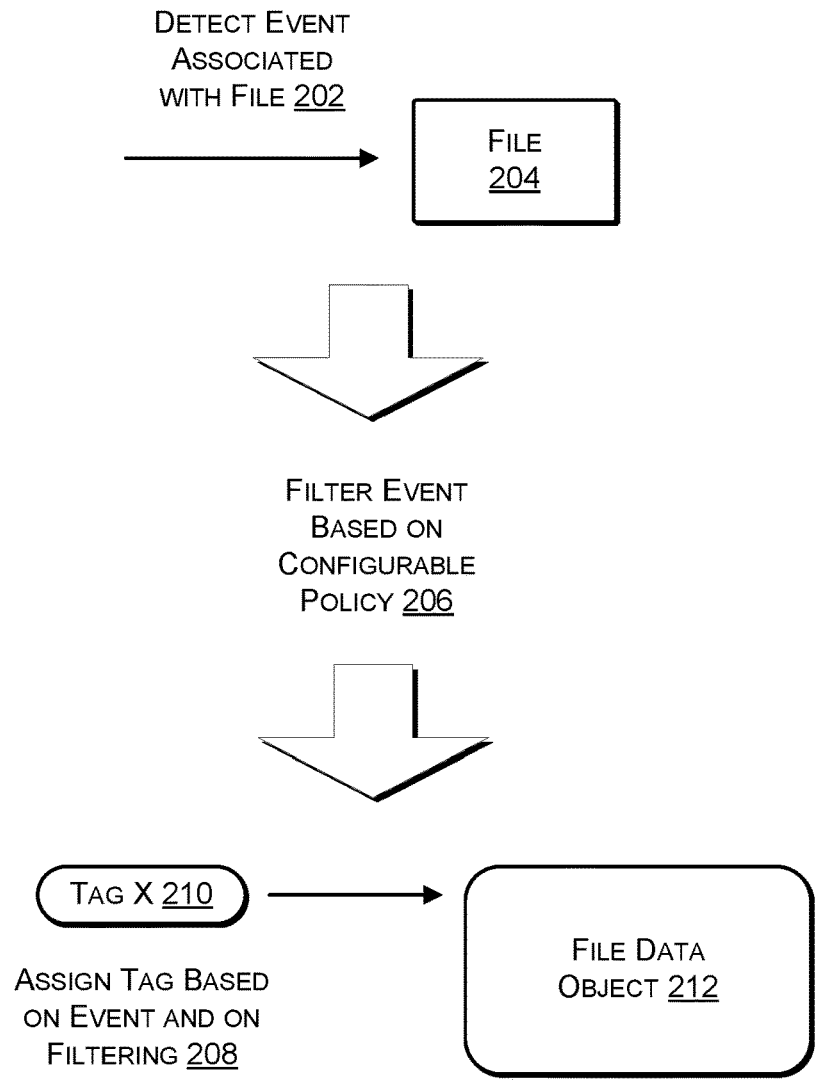
FIG. 2 illustrates an example system component associated with an event, the filtering of the event based on a configurable policy, and the assigning of a tag to a data object representing the system component based on the event and the filtering.

Further, as illustrated in FIG. 2, the security agent 124 may assign tags 138 to data objects 134 based on events and on the configurable policy. At 202, the security agent 124 may detect the occurrence of an event associated with a system component 126, such as a file 204. The security agent 124 may then, at 206, filter the event based on the configurable policy. Based on the detection of the event and the filtering, the security agent 124 then, at 208, assigns a tag 138, such as tag X 210, to the data object 134 representing the system component 126 (e.g., file data object 212 representing file 204).

In some embodiments, tags 138 may be propagated between data objects 134 by the security agent 124 based at least in part on the configurable policy and on detecting an event. When the security agent 124 detects an event, the security agent 124 consults the configurable policy and determines which tags 138 should be propagated among the data objects 134 representing the system components 126 associated with the event. For example, if a parent process creates a child process, some or all of the tags 138 of the data object 134 representing the parent process may be propagated by the security agent 124 to the data object 134 representing the child process.

Which tags 138 are propagated may be determined based on propagation rules associated with the tags 138 and included in the configurable policy. The configurable policy may include a propagation mask for each tag 138 that indicates the events that will cause the propagation of that tag 138. Such propagation masks may be compiler-generated bitmasks for each propagating event, allowing for a small, fixed number of operations for even a very large number of tags 138.

For example, in accordance with the configurable policy, a process may acquire some tags 138 by propagation from a file it loads. Propagation behavior may be different based on whether or not the file was loaded as a primary module.

Figure 3:
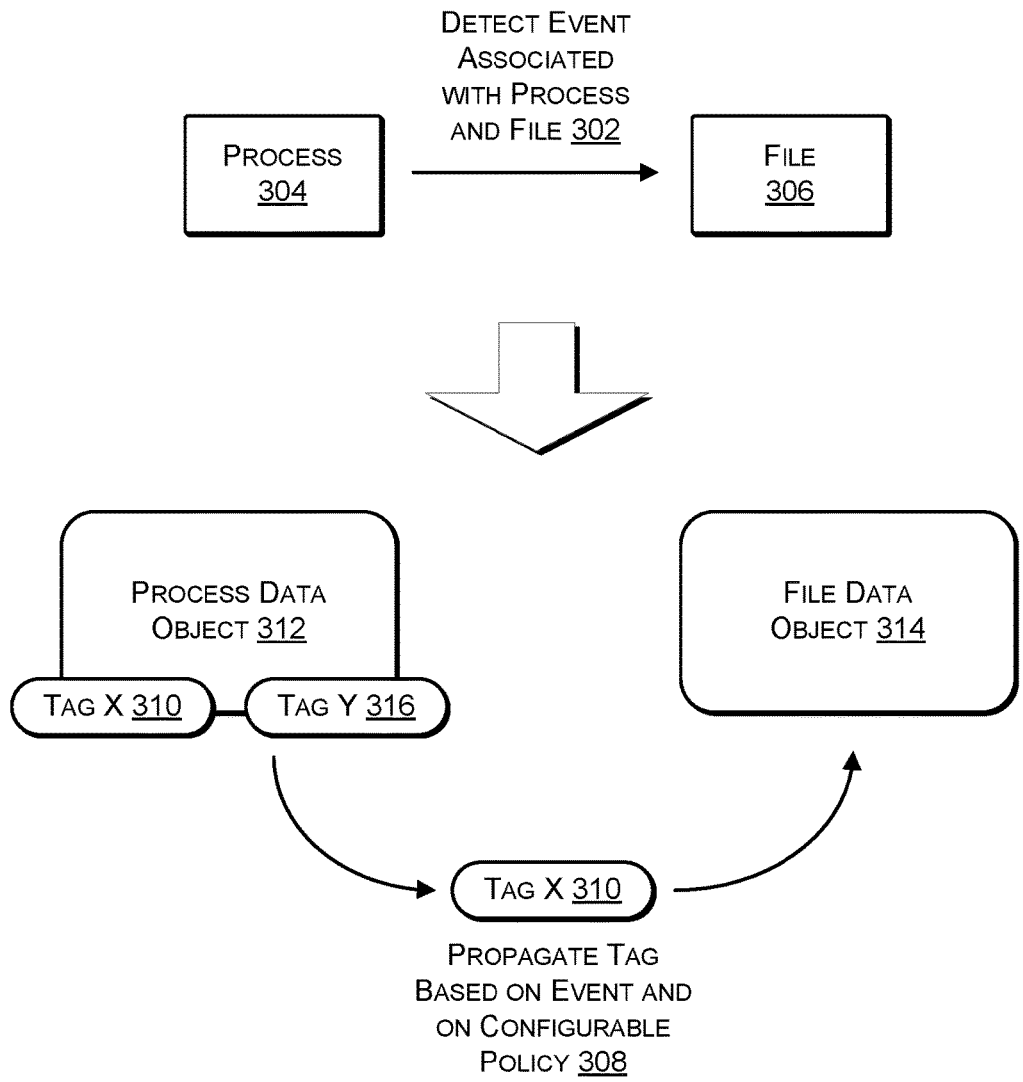
FIG. 3 illustrates example system components associated with an event and the propagation of a tag assigned to a data object representing one of these system components to another data object representing another of the system components.

FIG. 3 illustrates one example of such a tag propagation. As illustrated in FIG. 3, a security agent 124 may detect 302 an event that is associated with a process 304 and a file 306. For example, the process 304 might create, read, write to, or delete the file 306. In response, and in accordance with the configurable policy, the security agent 124 may propagate 308 a tag 310 (shown as "tag X 310") from data object 312 representing the process 304 to a data object 314 representing the file 306. The process data object 312 may also have additional tags, such as tag Y 316, which are not propagated to the file data object 314, in accordance with the configurable policy.

Figure 4:
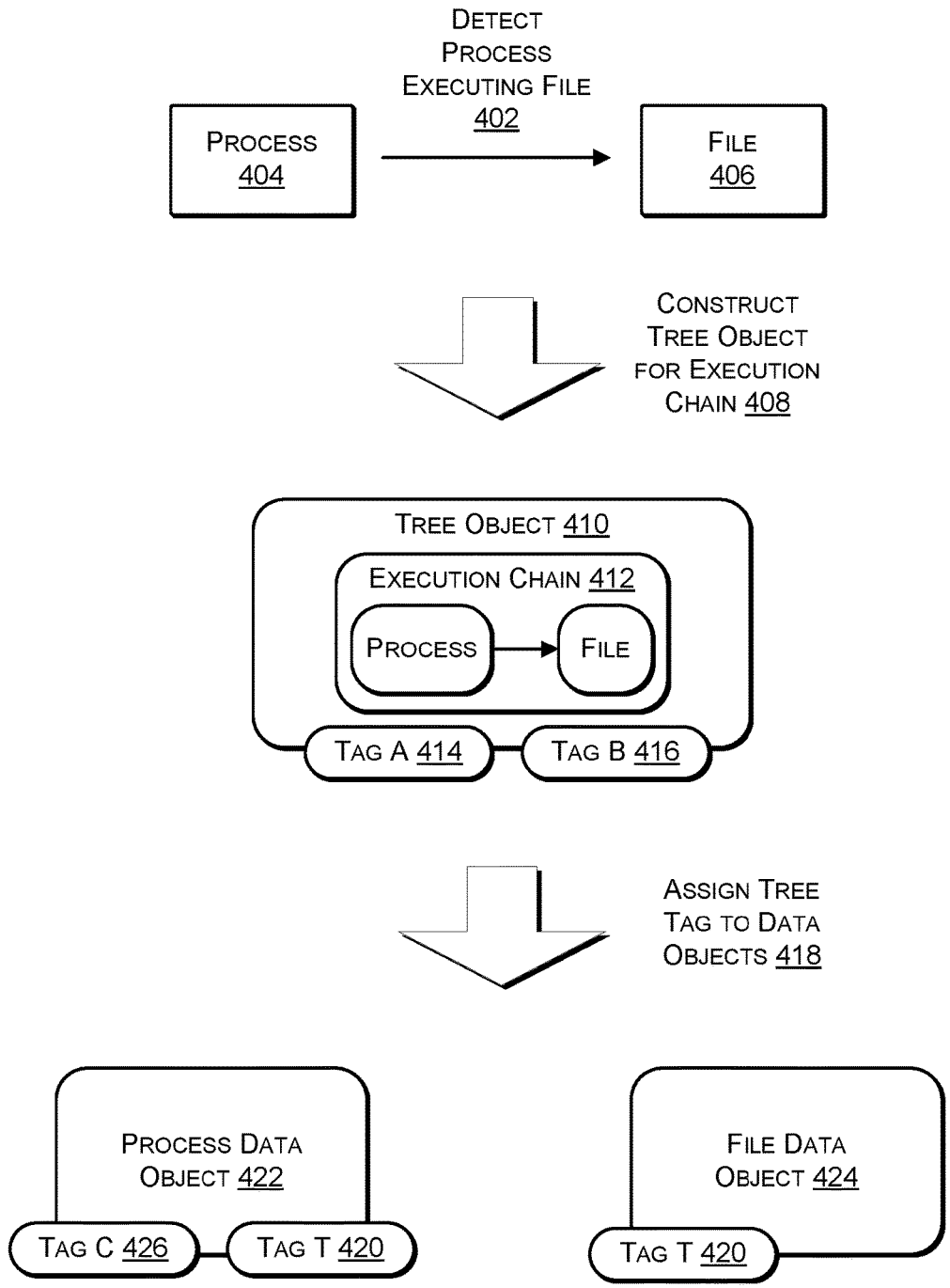
FIG. 4 illustrates a tree object representing an execution chain of system components, the assigning of tags to the tree object, and the assigning of a tag for the tree object to data objects representing the system components.

As described above, the security agent 124 may create tree objects 136 and tree tags 142 in accordance with the configurable policy. FIG. 4 illustrates an example of such tree object creation and tree tag assignment. As shown in FIG. 4, a security agent 124 detects 402 an event associated with a process 404 and a file 406, such as the execution of the file 406 by the process 404. In response, and in accordance with the configurable policy, the security agent 124 constructs 408 a tree object 410 for the execution chain 412 of the process 404 executing the file 406.

Subsequent to creating the tree object 410, the security agent 124 may expand the representation of the execution chain 412 to represent additional events and system components. For example, if the file 406 is an executable that then reads another file, the security agent 124 may update the representation of the execution chain 412 in the tree object 410 to reflect the extension of the execution chain 412. The security agent 124 may also assign tags 138 to the tree object 410, such as tag A 414 and tag B 416. These tags 414 and 416 may be taxonomic tags 140 or social tags 144. The security agent 124 may assign the tags 414 and 416 in accordance with the configurable policy. For example, if a system component 126 or event included in the execution chain 412 is determined to be suspicious, the tag "suspicious" could be assigned to the tree object 410.

When creating the tree object 410, the security agent 124 also creates a tree tag 142 for the tree object 410 and assigns 418 the tree tag 142 (shown as "Tag T 420") to data objects 422 and 424 representing the process 404 and file 406, respectively. While data objects 422 and 424 are each shown as being assigned only a single tree tag 142, it is to be understood that any data object 134, such as data objects 422 and 424, may have multiple tree tags 142 assigned to it if the system component 126 or event represented by that data object 134 appears in multiple tree objects 136.

The data objects 422 and 424 may also have other tags 138 assigned to them. For example, the process data object 422 may have a tag C 426 assigned to it. When the security agent 124 subsequently filters the data objects 422 and 424 based on tags 138, the security agent 124 will consider, for instance, the process data object 422 to have tag C 426, tag T 420, and by virtue of tag T 420, both tag A 414 and tag B 416 as well. Process data object 422 will be considered to have tag A 414 and tag B 416 transitively—there is no need for these tags 414 and 416 to be explicitly assigned as their association with tree tag T 420 is sufficient to ensure their application to the process data object 422.

Returning to FIG. 1, the security agent 124 or a user interface received from the security service provider (e.g., a web page) may also enable a user of the monitored device 102 to subscribe to social tags 146 of another entity 148 on behalf of the entity associated with the monitored device 102. The monitored device 102 may then received the social tags 146, either directly from monitored devices of the other entity 148 or through a security service computing device 104 of the security service cloud. The monitored device 102 may also continue to receive the subscribed-to social tags 146 on an ongoing basis, as the social tags 146 are created. Upon receiving the social tags 146, the security agent 124 may assign the social tags 146 to data objects 134. The social tags 146 are assign to data objects 134 that are equivalents of the data objects of the other entity. "Equivalent" data objects may be those representing a same or similar type of system component 126 or event. Upon receiving and assigning the social tags 146, those social tags 146 may be considered part of social tags 144.

Social tags 144 can be used to provide a number of capabilities; for instance, social tags 144 may be used arbitrarily for annotation, allowing coordination between multiple analysts and across entities. Social tags 144 on patterns and files can allow for expression of entity preferences about policy and priority of different patterns, and to allow entities to rapidly whitelist local programs and files overall or with respect to specific patterns.

Figure 5:
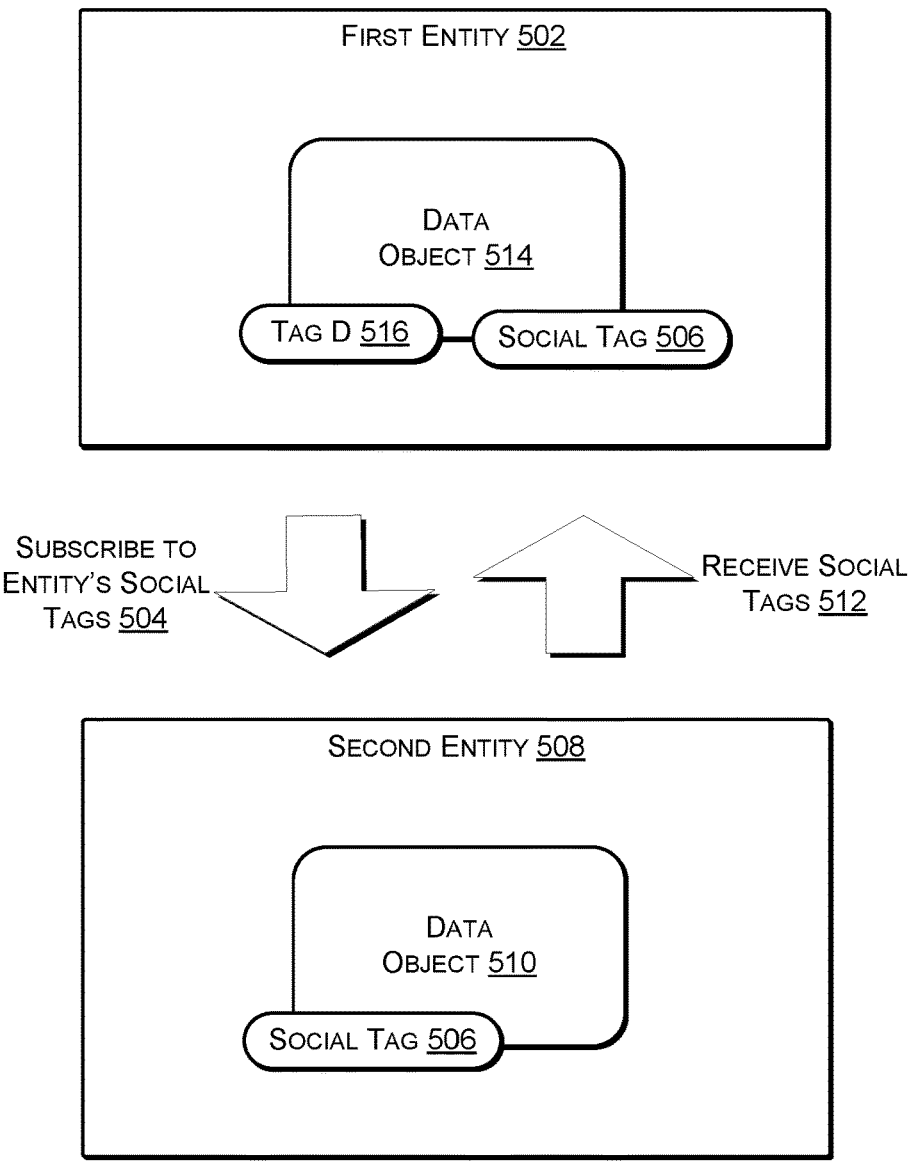
FIG. 5 illustrates one entity subscribing to the user-specified tags of another entity and assigning those user-specified tags to ones of the data objects of monitored devices of the entity.

FIG. 5 illustrates an example of subscription to another entity's social tags. As illustrated in FIG. 5, a first entity 502 may subscribe 504 to social tags 506 of a second entity 508. The social tags 506 may be assigned to data objects, such as data object 510, which represent system components 126 or events of monitored devices 102 of the second entity 508. Responsive to the subscription, the first entity 502 may receive 512 the social tags 506. Security agents 124 of the monitored devices 102 of the first entity 502 may then assign the social tags 506 to data objects 514. Data objects 514 may then have both any tags of their own, such as tag D 516, and the subscribed-to social tags 506.

In various embodiments, referring again to FIG. 1, the security agent 124 may utilize the tags 138 for reporting, decision-making, or event-generating. The security agent 124 may utilize the configurable policy and tags 138 to filter the data objects 134. The result of that filtering may then be utilized to generate a report, which may be provided to a user of the monitored device 102 through the security agent 124 or through a user interface provided by the security service cloud (e.g., a web page).

The security agent 124 may also or instead make a decision based on the filtered data objects 134. For example, if the filtered data objects 134 include any data objects 134 with the tag 138 "suspicious", the security agent 134 may decide to perform additional monitoring or take remedial action. Further, the security agent 124 may generate events. For example, if the security agent 124 propagates a tag 138 to a data object 134, and that data object 134 has another tag 138 that conflicts with the propagated tag 138, the security agent 124 may generate an event indicative of a tag conflict.

Tags 138 can also be used by the security agent 124 to trigger runtime policy. For example, a tag 138 could indicate that a process should not be allowed to make outbound network connections. Such tags 138 take their effect from the configurable policy that is used by the security agent 124 to filter on the presence of the tag 138.

In various embodiments, the security service computing devices 104 of the security service cloud may each maintain in its computer-readable media 122, a data object store 150, which may include data objects 152 and tags 154. The data object store 150 may represent current and past states of one or more of the monitored devices 102. The past states maintained can include at least a subset of past states, such as states that enhance forensic and policy understanding of the current state(s).

The data object store 150 may include a plurality of data objects 152 that represent system components 126 and events of the one or more monitored computing devices. These data objects 152 may form one or more graphs composed of nodes and edges, with node data objects representing system components 126 and edge data objects representing events. The data object store 150 may maintain separate graphs for each of the monitored devices 102, a graph for multiple ones of the monitored devices, or both.

A graph representing multiple ones of the monitored devices 102 may include representation of events associated with system components 126 from multiple monitored devices 102, such as a process on one monitored device 102 accessing a file on another monitored device 102. While not shown, the data object store 150 may include copies of the tree objects 136 created on the monitored devices 102.

In some embodiments, the tags 154 may be represent a superset of the tags 138 of the one or more monitored devices 102. Because the taxonomic tags 140 may be centrally created by the security service computing devices 104, the taxonomic tags 140 included in the tags 154 may be the same as, or at least include all of, the taxonomic tags 140 included in the tags 138. The taxonomic tags 140 included in the tags 154 may also include additional taxonomic tags 140 that have not yet been assigned to any data objects 134 or tree objects 136 of the monitored devices.

The tree tags 142 of the tags 154, in addition to identifying tree objects 136 of monitored devices 102, also include identifiers of the monitored devices 102 to which the tree objects 136 belong. The social tags 144 of the tags 154 include identifications of the entities that created those social tags 144. As mentioned above, the security service cloud may utilize these social tags 144 in defining additional taxonomic tags 140.

The communications model for tags 138 and 154 implemented by the security agents 124 and the security service cloud may define under what circumstances tags 138 flow between monitored devices 102 and security service computing devices 104. This flow may be implemented as another propagation operation, or possibly as two operations: one to passively forward tag 138 and another to push changes to the tag assignment proactively.

In further embodiments, the security modules 156 of the security service computing devices may be configured to provide information security services to individual users and client entities through their monitored devices 102, such as maintenance and configuration of the security agent 124 and data object store 134, threat modeling, and/or remediation. The security modules 156 may include a configuration module 158 to configure the security agents 124 and to provide the configurable policy to the security agents 124, a monitoring module 160 to detect events on the monitored devices 102 or to receive indications of the occurrences of those events, and a social module 162 to enable social aspects of the security services, such as the sharing of social tags 144.

In further embodiments, the security modules 156 may build and maintain the data object store 150. The monitoring module 160 of the security modules 156 may detect events or receive indications of the occurrence of events and use that information to build the data object store 150. Such information may be received in substantially real time as the events are observed. The configuration module 158 may configure the monitored devices 102, specifying the events that the monitored devices 102 are to notify the monitoring module 160 of and the tags 138 which the monitored devices 102 are to share.

Further, the configuration module 158 may update the configurable policy and disseminate the updated configurable policy to the monitored devices 102. Such an updated configurable policy may result in the updating of assignments of tags 138, removing some tags 138 and adding others. The updated configurable policy may also update propagation masks for tags 138, resulting in different propagation behaviors.

In some embodiments, the social module 162 may also provide social aspects to the security services, forming groups of users and/or client entities and automatically sharing security information among the users and/or client entities constituting a group. Alternatively or additionally, the social module 162 may enable the users or entities to subscribe to the social tags 144 of other users or other entities and enable the exchange of the subscribed-to tags 144, either retrieving and providing them or enabling users/entities to provide the social tags 144 to each other directly.

While not shown, the security modules 156 may also include one or more modules to act filter the tags 154 and act upon the filtering. Such actions may include decision-making, report-generating, or event-generating, in the manner described above with respect to the security agent 124. The actions may further include causing the configuration module 158 to update the configurable policy.

Example Processes

Figure 6:
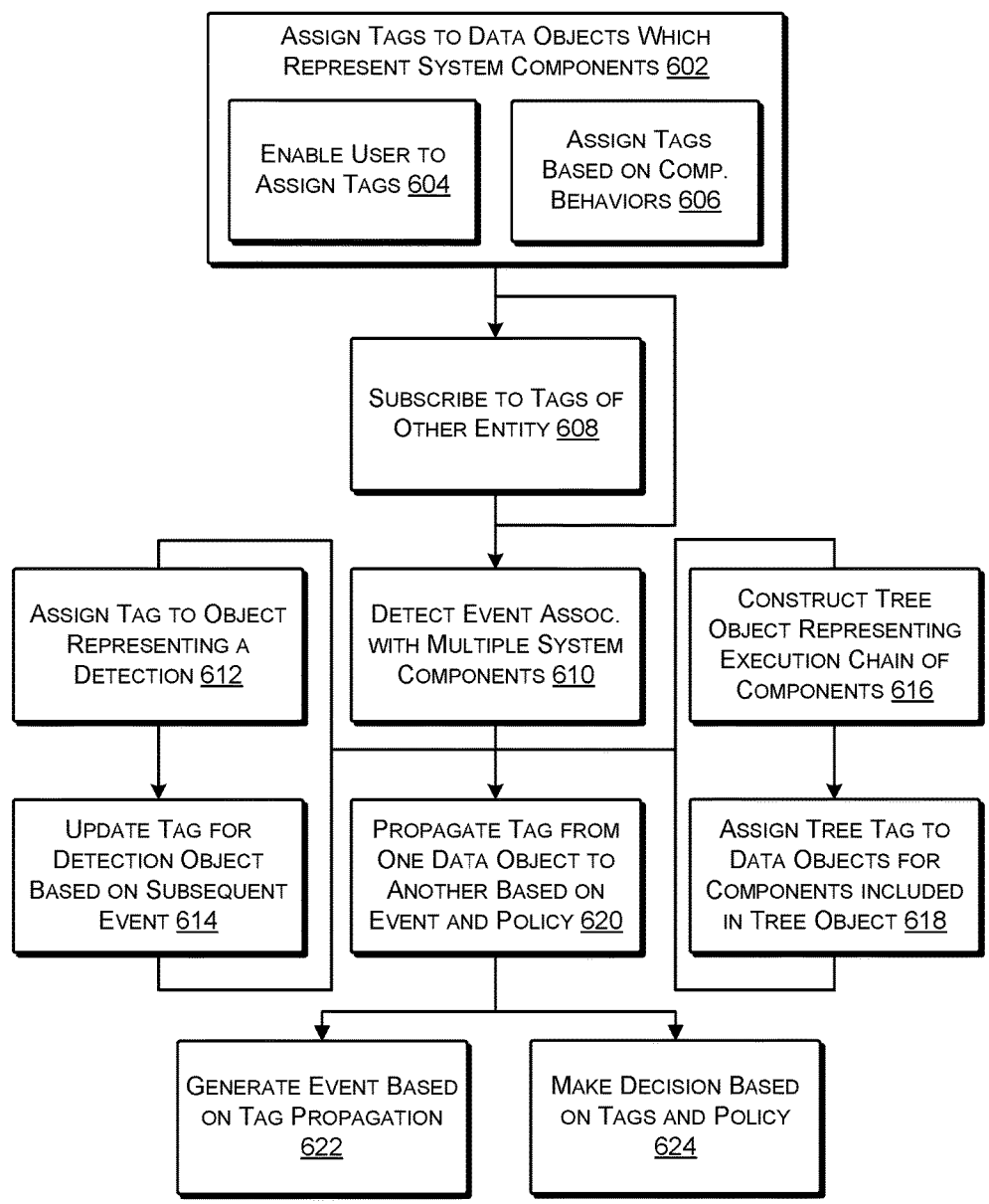
FIG. 6 is a flow diagram illustrating an example process for detecting an event associated with system components and propagating a tag assigned to a data object representing one of these system components to another data object representing another of the system components.

FIG. 6 illustrates an example process. This process is illustrated as a logical flow graph, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

FIG. 6 is a flow diagram illustrating an example process for detecting an event associated with system components and propagating a tag assigned to a data object representing one of these system components to another data object representing another of the system components.

The process includes, at 602, a security agent or security service cloud assigning tags to data objects representing system components of a computing device. Such assignment may be based on a configurable policy. The tags may each be one of a string, an integer, a hash, or a binary flag, and the system components may include at least one of modules, processes, threads, files, drivers, services, pipes, handles, named kernel objects, memory segments, users, cryptographic signers and signature authorities, registry keys, Internet Protocol (IP) addresses and subnets, domain name service (DNS) domains, or fully-qualified domain names (FQDNs). Also, the tags may have structure; a tag can imply another tag or be mutually exclusive with another tag. Further, a tag may be associated with logic which, when executed, classifies the system component represented by the data object and assigns a new tag (either in addition to the previous tag or replacing the previous tag) that is associated with the classification of the system component.

At 604, the assigning may include enabling a user to associate the tag with a system component represented by a data object and assigning that user-associated tag to the data object.

At 606, the assigning may include assigning a tag based at least in part on observed behavior or characteristics of a system component represented by a data object. Additionally or instead, the assigning may include assigning a tag to a data object representing a system component based at least in part on detecting an event associated with that system component and on filtering of that event using the configurable policy.

At 608, a security agent of a first entity may subscribe to user-specified tags of a second entity. The security agent may then assign the second entity's user-specified tags to data objects representing system components of computing devices of the first entity.

At 610, the security agent or security service cloud may detect an event occurring on a computing device that is associated with multiple system components of the computing device.

At 612, based on the configurable policy, the security agent or security service cloud may assign another tag to a data object representing the detection of the event.

At 614, the security agent or security service cloud may detect a subsequent event and, based at least in part on detecting the subsequent event, update the other tag.

At 616, the security agent or security service cloud may construct a tree object representing an execution chain of at least a subset of the system components. The security agent or security service cloud may construct the tree object in response to detecting execution of one system component of the subset of the system components by another system component of the subset of system components. The subset of system components may include both processes and non-process system components. At 618, the security agent or security service cloud may assign a tag for the tree object to the data objects representing the subset of the system components.

At 620, based at least in part on detecting the event and on the configurable policy, the security agent or security service cloud propagates a tag that is assigned to a data object representing one system component of the plurality of system components to another data object representing another of the plurality of system components. In some embodiments, the propagating comprises propagating, based at least in part on the configurable policy, fewer than all of a plurality of tags assigned to the data object. Also or instead, the propagating may comprise propagating, based at least in part on the configurable policy, the tag to data objects representing a subset of the plurality of system components.

Further, the system components may be system components of a computing device and the propagating may be performed by one or more other computing devices. In such embodiments, the data object and other data object may be stored on the one or more other computing devices. In addition, in some embodiments, the system component represented by the data object may be a system component of a first computing device, the other system component represented by the other data object may be a system component of a second computing device, and the propagating may be performed by any of the first computing device, the second computing device, or third one or more computing devices.

At 622, the security agent or security service cloud may generate an event based on the tag propagation. For example, the propagated tag may be mutually exclusive with another tag associated with the other data object, and the security agent or security service cloud may generate an event indicative of a tag conflict. Also or instead, at 624, based at least in part on tags associated with data objects representing the plurality of system components, the security agent or security service cloud may perform at least one of making a decision or generating a report.

Example Clauses

A. A computer-implemented method comprising: detecting an event associated with a system component; filtering the event based on a configurable policy; and based at least in part on the detecting and the filtering, assigning a tag to a data object representing the system component.

B. The method of paragraph A, wherein the detecting, the filtering, and the assigning are performed by a kernel-level security agent.

C. The method of paragraph A or B, wherein the tag is one of a string, an integer, a hash, or a binary flag.

D. The method of any of paragraphs A-C, further comprising assigning, based at least in part on the configurable policy, another tag to a data object representing the detection of the event.

E. The method of any of paragraphs A-D, wherein the tag can imply another tag or be mutually exclusive with another tag.

F. The method of any of paragraphs A-E, wherein the assigning is based at least in part on observed behavior or characteristics of the system component represented by the data object.

G. The method of any of paragraphs A-F, wherein the tag is associated with logic which, when executed, classifies the system component represented by the data object and assigns a new tag that is associated with the classification of the system component.

H. The method of any of paragraphs A-G, further comprising, based at least in part on the tag associated with the data object representing the system component, performing at least one of making a decision or generating a report.

I. The method of any of paragraphs A-H, further comprising: enabling a user to associate the tag with the system component represented by the data object, and performing the assigning of the tag to the data object based at least in part on the user associating the tag with the system component.

J. The method of paragraph I, wherein the tag is shareable with one or more other users of one entity that subscribes to tags associated by the user or another user of another entity with the system component.

K. A computer-implemented method comprising: detecting an event associated with a plurality of system components; and based at least in part on a configurable policy and on detecting the event, propagating a tag that is assigned to a data object representing one of the plurality of system components to another data object representing another of the plurality of system components.

L. The method of paragraph K, wherein the tag is one of a string, an integer, a hash, or a binary flag.

M. The method of paragraph K or L, wherein the propagating comprises propagating, based at least in part on the configurable policy, less than all of a plurality of tags assigned to the data object.

N. The method of any of paragraphs K-M, wherein the propagating comprises propagating, based at least in part on the configurable policy, the tag to data objects representing a subset of the plurality of system components.

O. The method of any of paragraphs K-N, wherein the tag is mutually exclusive with another tag associated with the other data object, and the method further comprises generating an event indicative of a tag conflict.

P. The method of any of paragraphs K-O, wherein the system components include at least one of modules, processes, threads, files, drivers, services, pipes, handles, named kernel objects, memory segments, users, cryptographic signers and signature authorities, registry keys, Internet Protocol (IP) addresses and subnets, domain name service (DNS) domains, or fully-qualified domain names (FQDNs).

Q. The method of any of paragraphs K-P, wherein the tag is associated with a tree object that represents instances of at least a subset of the plurality of system components.

R. The method of any of paragraphs K-Q, wherein the system components are system components of a computing device and the propagating is performed by one or more other computing devices, the data object and other data object being stored on the one or more other computing devices.

S. The method of any of paragraphs K-R, wherein the system component represented by the data object is a system component of a first computing device, the other system component represented by the other data object is a system component of a second computing device, and the propagating is performed by any of the first computing device, the second computing device, or a third one or more computing devices.

T. A system comprising: a processor; a memory coupled to the processor, the memory storing: data objects representing a plurality of system components, a tree object representing an execution chain of instances of at least a subset of the system components, and executable instructions, which, when operated by the processor, perform operations including: assigning a tag for the tree object to the data objects representing the subset of the system components, assigning one or more tags to the tree object, those tags applying to the data objects having the tag for the tree object, and making a decision based at least in part on tags assigned to the data objects representing the subset of the system components and the tags assigned to tree object.

U. The system of paragraph T, wherein the operations further include constructing the tree object in response to detecting execution of one system component of the subset of the system components by another system component of the subset of system components.

V. The system of paragraph T or U, wherein the subset of system component includes both processes and non-process system components.

W. The system of any of paragraphs T-V, wherein the memory stores multiple tree objects, and tags for the multiple tree objects are assigned to a data object representing a system component which appears in execution chains represented by the multiple tree objects.

X. One or more non-transitory computer-readable media having stored thereon a plurality of programming instructions that, when executed by a computing device, cause the computing device to perform operations comprising: subscribing, by an entity, to user-specified tags of another entity, the user-specified tags being associated with data objects representing system components of computing devices of the other entity, assigning the other entity's user-specified tags to data objects representing system components of computing devices of the entity; and making a decision based at least in part on the other entity's user-specified tags.

Y. The one or more non-transitory computer-readable media of paragraph X, wherein one of the user-specified tags is a taxonomic tag applied to an unclassified system component.

Z. The one or more non-transitory computer-readable media of paragraph X or Y, wherein user-specified tags are shared with a service cloud and utilized by the service cloud in determining global changes in tag assignments.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

What is claimed is:

1. A computing device comprising:
    a processor; and
    a memory coupled to the processor, the memory storing:
        a tree object representing an execution chain of at least a first system components and a second system component of a plurality of system components, wherein the tree object comprises:
            an indication of the first system component; and
            an indication of the second system component;
        a first data object representing the first system component;
        a second data object representing the second system component; and
        executable instructions;
    wherein the executable instructions, when operated by the processor, cause the processor to perform operations including:
        assigning, to both the first data object and the second data object, a first tag representing the tree object;
        detecting a first event associated with the first system component;
        in response to the first event, assigning, to the tree object, a second tag, wherein the second tag applies transitively to the data objects via the first tag;
        detecting a second event subsequent to the first event and associated with the second system component; and
        in response to the second event, performing a remedial action with respect to the first system component based at least in part on the second tag assigned to the tree object and the first tag assigned to the first data object.

2. The computing device of claim 1, wherein:
    the operations include performing the remedial action further based on at least one of the second tag or a third tag assigned to at least one of the first data object and the second data object; and
    the at least one of the second tag or the third tag indicates suspicious behavior or exploit activity.

3. The computing device of claim 1, wherein the operations further include:
    detecting execution by the first system component of the second system component; and
    in response:
        constructing the tree object in the memory; and
        assigning the first tag to the first data object and to the second data object.

4. The computing device of claim 1, wherein the first system component includes a process, and the second system component comprises a non-process system component.

5. The computing device of claim 4, wherein the non-process system component includes a file written by the process.

6. The computing device of claim 1, wherein:
    the memory further stores a second tree object representing a second execution chain of a subset of the plurality of system components;
    the second tree object is associated with a fourth tag; and
    the operations further include:
        determining that a first system component of the at least some system components appears in the second execution chain; and
        assigning the fourth tag to the respective data object representing the first system component.

7. A computer-implemented method comprising:
    performing the following operations:
        creating, in a computer-readable memory, a first data object representing a first system component of a monitored computing device;
        creating, in the computer-readable memory, a second data object representing a second system component of a monitored computing device;
        creating, in the computer-readable memory, a tree object representing an execution chain, the tree object comprising:

an indication of the first system component; and
an indication of the second system component;
assigning, to both the first data object and the second data object, a first tag representing the tree object; and
subsequently, performing the following operations:
detecting a first event associated with the first system component;
in response to the first event, assigning, to the tree object, a second tag, wherein the second tag applies transitively to the first data object and the second data object via the first tag;
detecting a second event subsequent to the first event and associated with the second system component; and
in response to the second event, performing a remedial action with respect to the first system component based at least in part on the second tag.

8. The method of claim 7, wherein:
the method further includes:
filtering the second tag based on the stored configuration to provide a result; and
performing the remedial action further based on the result.

9. The method of claim 7, further including:
detecting an event associated with both the first system component and the second system component; and
in response, creating the tree object.

10. The method of claim 9, further including, before creating the tree object, determining that the event corresponds with a configurable policy.

11. The method of claim 7, further including:
detecting an event associated with at least one of the first system component and the second system component;
filtering the event based on a configurable policy to provide a result; and
based at least in part on the result and on the first tag, updating the tree object by at least one of:
assigning a tag to the tree object; or
removing a tag from the tree object.

12. The method of claim 7, further including:
detecting execution by the first system component of the second system component of the monitored computing device; and
creating the second data object in response to the detection of the execution.

13. The method of claim 7, further including:
detecting an event associated with at least the first system component and the second system component; and
in response, based at least in part on a configurable policy, propagating, from the first data object to the second data object, at least one tag assigned to the first data object.

14. The method of claim 13, wherein the propagating includes propagating the at least one tag and fewer than all of a plurality of tags assigned to the first data object.

15. The method of claim 13, further including:
determining that the at least one tag is mutually exclusive with a third tag associated with the second data object; and
in response, generating an event indicative of a tag conflict.

16. A computer-implemented method, comprising:
performing the following operations:
receiving, via a network, information of a first system component and a second system component of a monitored computing device;
creating, in a computer-readable memory, a first data object representing the first system component and a second data object representing the second system component;
receiving, via the network, an indication of a first event associated with both the first system component and the second system component;
creating, in the computer-readable memory, a tree object representing the first event, the tree object comprising:
an indication of the first system component; and
an indication of the second system component and subsequently, performing the following operations:
assigning, to both the first data object and the second data object, a first tag representing the tree object;
receiving, via the network, an indication of a second event associated with the first system component;
in response to the second event, assigning, to the tree object, a second tag;
receiving, via the network, an indication of a third event subsequent to the second event and associated with the second system component; and
in response to the third event, performing a remedial action with respect to the first system component based at least in part on the second tag.

17. The method of claim 16, further including at least one of:
assigning, to at least one of the first data object or the second data object, a third tag representing the monitored computing device; or
assigning, to the tree object, the third tag.

18. The method of claim 16, further including:
receiving, via the network, information of a third system component, the third system component being a system component of a second monitored computing device;
creating, in the computer-readable memory, a third data object representing the third system component; and
in response to the indication of the event, updating at least one tag of the second third data object.

19. The method of claim 16, further including:
in response to the indication of the event, updating a configurable policy to provide an updated policy; and
transmitting, via the network, the updated policy to a second monitored computing device.

20. The method of claim 16, further including:
assigning, to at least one of the first data object or the second data object, a third tag; and
performing the action further based at least in part on the third tag.

* * * * *